UNITED STATES PATENT OFFICE.

THOMAS A. EDISON, OF LLEWELLYN PARK, NEW JERSEY.

REVERSIBLE GALVANIC BATTERY.

SPECIFICATION forming part of Letters Patent No. 721,682, dated March 3, 1903.

Application filed November 28, 1902. Serial No. 133,119. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Reversible Galvanic Batteries, of which the following is a description.

My invention relates to reversible galvanic batteries of the type employing an alkaline electrolyte and insoluble electrolytically-active materials; and the invention relates particularly to the oxidizable element—namely, the element employing an active material which is oxidized on discharge and reduced during the charging operation.

The invention consists in the use of cobalt oxid, preferably mixed with metallic mercury or with metallic mercury and copper or silver, whereby a great proportion of the cobalt oxid is kept in electrical contact with the electrode and made electrolytically active in an alkaline solution to form the oxidizable element on discharge.

The invention also consists in the combination of such an element with a suitable depolarizer furnishing oxygen on discharge in an alkaline electrolyte to form a complete reversible galvanic battery.

In order to produce the new element, I prefer to proceed substantially as follows: Dried oxalate of cobalt is first produced in any suitable way and is ignited and kept at a low temperature in the air until it has been wholly decomposed to form the anhydrous oxid of cobalt. This oxid is then mixed with preferably about fifteen per cent. of precipitated oxid of mercury if an electrode is to be obtained composed of cobalt and mercury, or, if desired, it may be mixed, preferably, with about twenty-five per cent. of finely-divided metallic copper and six per cent. of precipitated oxid of mercury if the resulting electrode is to be formed of cobalt and a combination of copper and mercury. These proportions of course may be varied; but those indicated give good results. I find, in fact, that by increasing the proportion of mercury or of mercury and copper a larger proportion of the cobalt is rendered active; but the increase in efficiency is secured at a sacrifice of lightness and economy. Silver may also be employed in place of the copper; but it possesses the objection of being too expensive at the present time for economical use. The mixture of oxid of cobalt and oxid of mercury or of oxid of cobalt, metallic copper, and oxid of mercury is then mixed thoroughly, formed into briquets, and utilized in any desired manner, preferably by being supported in perforated nickel-plated pockets or receptacles, which in turn are crimped in position within plates or grids, as I have described in patents already granted to me. An electrode containing a mixture of cobalt and mercury or of cobalt, mercury, and copper or silver is preferably employed in an alkaline solution of, say, twenty per cent. of potassic hydroxid in water opposed to a depolarizing element containing nickel hydroxid as the active material mixed with foliated or flake graphite. When such a combination has been charged and recharged several times, its average voltage is about 1.10 volts. When such a combination is in a fully-charged condition, the nickel hydroxid is raised to a very high state of oxidation and the cobalt is reduced, so far as its active particles are concerned, to the metallic state. On discharging the nickel hydroxid reverts to a lower condition of oxidation, while the metallic cobalt is oxidized. Owing to the relative ease, as compared to cobalt, with which mercury and copper reduce, the added mercury or copper, or silver, if used, will be reduced to the metallic state when the battery is first charged, so as to procure good electrical contact between the active cobalt particles. Since the cobalt on discharge oxidizes much more readily than either mercury, copper, or silver, the latter materials remain in metallic form, and their presence serves wholly to assist electrical conduction between the particles of the active material.

Although I prefer to add a readily-reducible metal, like mercury, copper, or silver, or a combination thereof, to the cobalt for the purpose of maintaining electrical contact between the active materials, it will be of course understood that any insoluble conducting material, preferably in flake form, such as flake graphite, can be used for maintaining the cobalt particles in electrical contact.

Having now described my invention, what I claim is—

1. An oxidizable element for a reversible galvanic battery employing cobalt, which is oxidized on discharge, substantially as set forth.

2. In a reversible galvanic battery employing an alkaline electrolyte, an oxidizable element therefor employing cobalt, which is oxidized on discharge, substantially as set forth.

3. An oxidizable element for a reversible galvanic battery employing cobalt as the active material, and a more readily reducible metal or combination of such metals added thereto for preserving electrical contact between the active particles, substantially as set forth.

4. In a reversible galvanic battery, an oxidizable element employing cobalt as the active material, mixed with metallic mercury for preserving electrical contact between the active particles, substantially as set forth.

5. A reversible galvanic battery employing cobalt as the active material, mixed with metallic mercury and another readily-reducible metal for preserving electrical contact between the active particles, substantially as set forth.

6. In a reversible galvanic battery, an oxidizable element therefor employing cobalt as the active material, mixed with metallic mercury and metallic copper for preserving electrical contact between the particles of active material, substantially as set forth.

7. In a reversible galvanic battery, the combination with a depolarizing-electrode, of an oxidizable electrode employing cobalt as the oxidizable material on discharge, substantially as set forth.

8. In a reversible galvanic battery employing an alkaline electrolyte, the combination with a depolarizing-electrode, of an oxidizable electrode employing cobalt as the oxidizable active material on discharge, substantially as set forth.

9. In a reversible galvanic battery, the combination with a depolarizing-electrode, of an oxidizable electrode employing cobalt as the oxidizable material on discharge, and a readily-reducible metal mixed with the cobalt for preserving electrical contact between the active particles, substantially as set forth.

10. In a reversible galvanic battery, the combination with a depolarizing-electrode, of an oxidizable electrode employing cobalt as the oxidizable material on discharge, and metallic mercury mixed with the cobalt for preserving electrical contact between the active particles, substantially as set forth.

11. In a reversible galvanic battery, the combination with a depolarizing-electrode, of an oxidizable electrode employing cobalt as the oxidizable material on discharge, and metallic mercury and copper mixed with the cobalt for preserving electrical contact between the active particles, substantially as set forth.

12. In a reversible galvanic battery, the combination with a depolarizing-electrode employing nickel hydroxid as the active material, of an oxidizable electrode employing cobalt as the oxidizable material on discharge, substantially as set forth.

13. In a reversible galvanic battery, the combination with a depolarizing-electrode employing nickel hydroxid as the active material, of an oxidizable electrode employing cobalt as the oxidizable material on discharge, and a readily-reducible metal mixed with the cobalt for preserving electrical contact between the active particles, substantially as set forth.

14. In a reversible galvanic battery, the combination with a depolarizing-electrode employing nickel hydroxid as the active material, of an oxidizable electrode employing cobalt as the oxidizable material on discharge, and metallic mercury mixed with the cobalt for preserving electrical contact between the active particles, substantially as set forth.

15. In a reversible galvanic battery, the combination with a depolarizing-electrode employing nickel hydroxid as the active material, of an oxidizable electrode employing cobalt as the oxidizable material on discharge, and metallic mercury and copper mixed with the cobalt for preserving electrical contact between the active particles, substantially as set forth.

This specification signed and witnessed this 13th day of November, 1902.

THOS. A. EDISON.

Witnesses:
 FRANK L. DYER,
 J. F. RANDOLPH.